(12) United States Patent
Imai

(10) Patent No.: US 6,505,863 B2
(45) Date of Patent: Jan. 14, 2003

(54) CONNECTOR

(75) Inventor: Takashi Imai, Gyoda (JP)

(73) Assignee: Surpass Industry Co., Ltd., Gyoda (JP)

( * ) Notice: Subject to any disclaimer, the term of this patent is extended or adjusted under 35 U.S.C. 154(b) by 0 days.

(21) Appl. No.: 09/898,408

(22) Filed: Jul. 3, 2001

(65) Prior Publication Data

US 2002/0005641 A1 Jan. 17, 2002

(30) Foreign Application Priority Data

Jul. 11, 2000 (JP) ........................................ 2000-210297

(51) Int. Cl.⁷ ................................................. F16L 39/00
(52) U.S. Cl. ..................... 285/316; 285/124.1; 285/331; 285/148.21
(58) Field of Search ............................. 285/148.21, 316, 285/124.1, 331

(56) References Cited

U.S. PATENT DOCUMENTS

| 3,228,413 A | * | 1/1966 | Stevens, Jr. ................. 137/322 |
| 3,710,823 A | * | 1/1973 | Vik ............................. 137/594 |
| 3,843,172 A | * | 10/1974 | Stevens, Jr. ................. 137/322 |
| 3,905,522 A | * | 9/1975 | Johnston ..................... 137/212 |
| 4,699,298 A | * | 10/1987 | Grant et al. ............. 222/400.7 |
| 5,108,015 A | * | 4/1992 | Rauworth et al. .......... 137/212 |
| 5,526,956 A | * | 6/1996 | Osgar ......................... 222/105 |
| 5,695,168 A | * | 12/1997 | Williams .................... 137/322 |
| 5,971,019 A | * | 10/1999 | Imai ...................... 137/614.04 |
| 6,302,148 B1 | * | 10/2001 | Imai ........................... 137/209 |

* cited by examiner

*Primary Examiner*—Eric K. Nicholson
(74) *Attorney, Agent, or Firm*—Kolisch Hartwell Dickinson McCormack & Heuser

(57) ABSTRACT

A plug portion 23 which engages to a socket 13, to which a liquid transport hose and a gas transport hose 7 are connected, is provided to a plug 12 which closes an aperture portion which is formed in a container. A liquid conduit 26 on the side of the plug 12 which is communicated to a liquid conduit 56 on the side of the socket 13 is formed on the inner side of the plug portion 23, while a gas conduit 41 on the side of the plug 12 which is communicated to gas conduits 52 and 63 on the socket side is formed on the outer side of the plug portion 23. By this construction, it is possible to anticipate simplified and reduced cost manufacture for a connector which excels in convenience due to having a plurality of conduits.

18 Claims, 6 Drawing Sheets

CONNECTOR

FIELD OF THE INVENTION

The present invention relates to a connector which is fitted to an aperture portion of a container which stores a liquid such as, for example, semiconductor high purity chemicals or general chemicals or the like and which is used for taking out and supplying the stored fluid, and in particular relates to such a connector which has a plurality of conduits.

BACKGROUND OF THE INVENTION

A liquid such as, for example, semiconductor high purity chemicals or general chemicals or the like is filled into a container in the production facility, and is despatched in the state with lids (not shown in the figures) covering over aperture portions formed in this container.

When the liquid which is stored in this container is to be taken out therefrom, as shown in FIG. 6, first the lids which covered over aperture portions 1a and 1b of the container 1 are taken off therefrom, and a plug 3a to which a syphon tube 2 is connected and a plug 3b to which no such syphon tube is connected are fitted to these aperture portions 1a and 1b respectively.

And a socket 4a to which is connected a liquid transport hose 5 is connected to the plug 3a while a socket 4b to which a gas transport hose 7 is connected to the plug 3b, and the liquid in the container 1 is sucked up to the plug 3a via the syphon tube 2 by a pump (not shown in the figure) and is conducted into the liquid transport hose 5 which is connected to the socket 4a.

At this time gas such as nitrogen or the like is supplied through a gas transport hose 7 which is connected to the other socket 4b, in order that no vacuum should build up in the container 1.

On the other hand, as a technique for one-touch connection of the sockets 4a and 4b to the plugs 3a and 3b, there is a per se known connector which has been disclosed in Japanese Patent Laying-Open Publication 7-277400.

This connector comprises a lock mechanism in which, along with hole portions being formed at intervals around the circumferential direction of a wall portion which defines a concave portion on the side of the socket, latching balls are received in these hole portions so as to be able to enter into and to come out of the concave portion, and, by a sleeve which is disposed around the outer peripheral surface of the concave portion being made to slide in the axial direction, the latching balls are caused to be projected from the hole portions into within the concave portion, thus engaging the latching balls into an engagement groove which is formed around the outer peripheral surface of a plug which comprises a liquid conduit and which is engaged into the concave portion.

However it sometimes happens that, when taking liquid out of the container 1, circulation is performed as shown in FIG. 7(a) so as to pass the liquid through a filter in order to eliminate contaminants and the like.

In this case, with the above described single conduit connectors 6a and 6b, the problem has arisen that the system becomes rather complicated, since, along with connecting the connector 6a for taking out the liquid and the connector 6b for feeding in gas by a piping system 10 for circulation, it has been necessary to provide a valve 9 for opening and closing a conduit within this piping system 10 for circulation.

Furthermore, since the surface of the liquid within the container 1 becomes ruffled (which is undesirable) when liquid drips from the connector 6b for feeding in gas, therefore this ruffling must be suppressed, and accordingly during such circulation another syphon tube 2 has been connected to the connector 6b for feeding in gas as well.!!

However, if a syphon tube 2 is connected to the connector 6 for feeding in gas, then, although it is possible to suppress the generation of ruffles upon the surface of the liquid within the container 1, the particular problem described below occurs.

Namely, when circulation has been completed and the liquid is to be taken out of the container 1, the valve 9 is closed, and nitrogen is fed in through the connector 6b for feeding in gas in order to prevent the build up of vacuum; but, since the syphon tube 2 dips in below the surface of the liquid in the container 1, at this time the nitrogen bubbles out below the surface of the liquid, and in some cases this may cause an undesirable reaction.

In order to avoid this problem, the nitrogen may be supplied into the container 1 at a position higher than the surface of the liquid therein, but in order to do this it is necessary to remove the syphon tube, if the connector 6b is a single conduit type connector.

On the other hand, if both of the plugs 3a and 3b and the sockets 4a and 4b are made as double connectors which have both a liquid conduit and a gas conduit, as shown in FIG. 7(b), then the above described problem is completely eliminated. Furthermore, if these plugs and sockets which are provided with a plurality of conduits are structured as connectors which are connected together via locking mechanisms of the above described type, then it also becomes possible to perform a one-touch operation for connecting the plugs with the sockets, and the quality of the product is further enhanced.

However, if not only a liquid conduit but also a gas conduit is to be formed in the interior of the plug, then due to this the external diameter of the plug is increased, which invites increase of the size of the locking mechanism, and moreover the internal structure of the plug becomes more complicated, which makes its process of manufacture more difficult, so that the new problem of increase of cost arises.

Accordingly, the present invention has as its objective the proposal of a connector whose usability is excellent due to its being provided with a plurality of conduits, and which is easy to manufacture at low cost.

SUMMARY OF THE INVENTION

The connector according to the present invention includes a plug which closes an aperture portion formed in a container and a socket which is connected to a hose, and, by connection together of this plug and this socket, mutually communicates together main conduits which are formed in this plug and socket, and sub-conduits which are formed in this plug and socket; and this plug includes a plug portion to which the socket is engaged and which maintains the connection state to the socket, with this plug portion having the main conduit in its internal portion while it has the sub-conduit externally.

And since, according to the present invention as described above, in the same manner as in the prior art, only a single conduit is provided to the plug portion to which the socket is engaged, therefore it is possible to avoid increase in the size of the plug portion and increase of complication of its internal structure.

Accordingly it is possible to provide a connector whose usability is excellent due to its being provided with a plurality of conduits, and which is easy to manufacture at low cost.

DETAILED DESCRIPTION OF THE PREFERRED EMBODIMENT OF THE PRESENT INVENTION

In the following a preferred embodiment of the present invention will be explained with reference to the figures.

Figure 1:
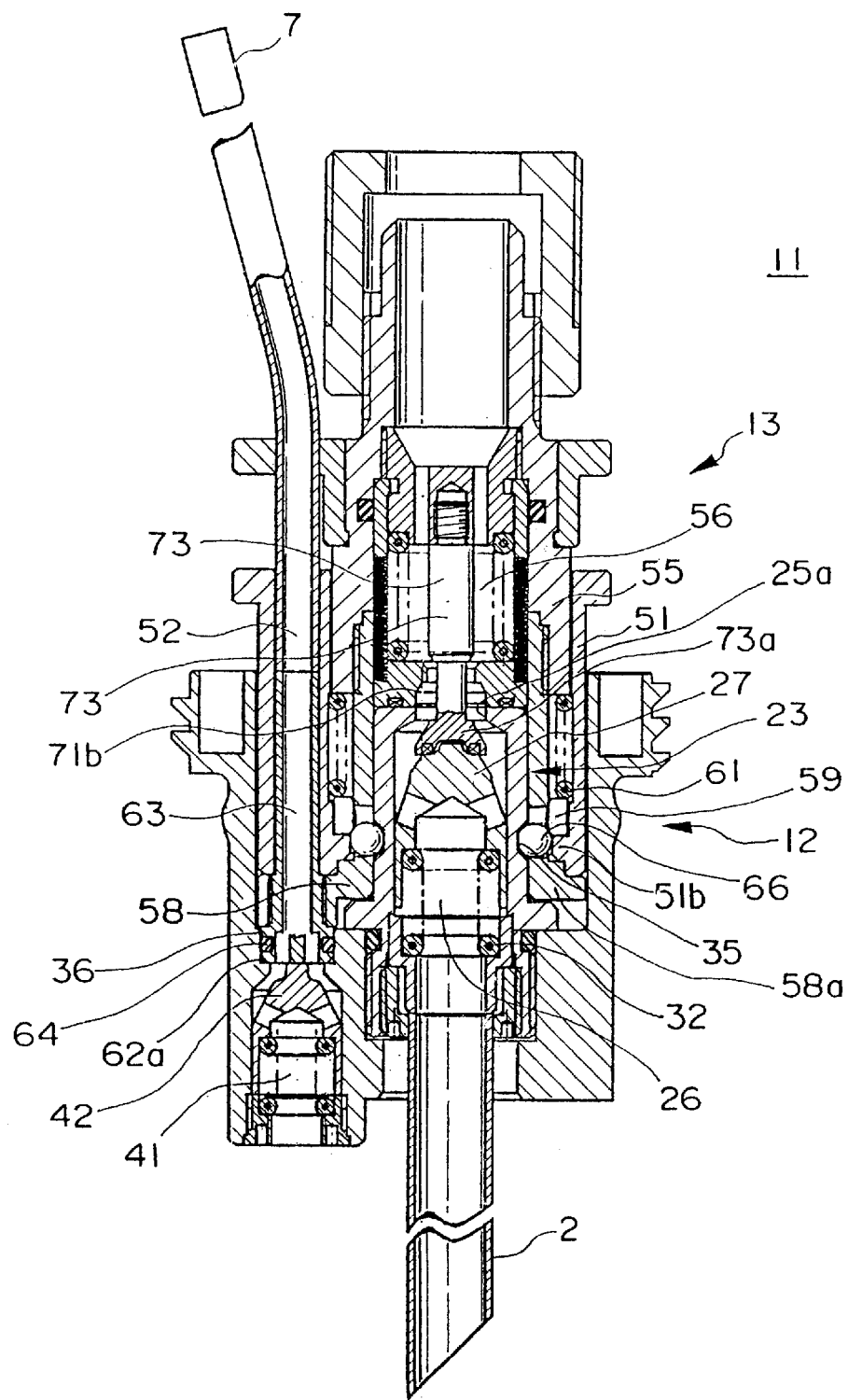
FIG. 1 is a vertical sectional view for explanation of the structure of the preferred embodiment of the connector according to the present invention.

Referring to FIG. 1, the reference symbol 11 denotes a connector according to this preferred embodiment, and this connector 11 comprises a plug 12 and a socket 13 which is connected to this plug 12. Further, a syphon tube 2 is connected to the rear end portion of this plug 12, while a liquid transport hose (not shown in the drawings) and a gas transport hose 7 are connected to the rear end portion of the socket 13.

Structure of the Plug

Figure 2:
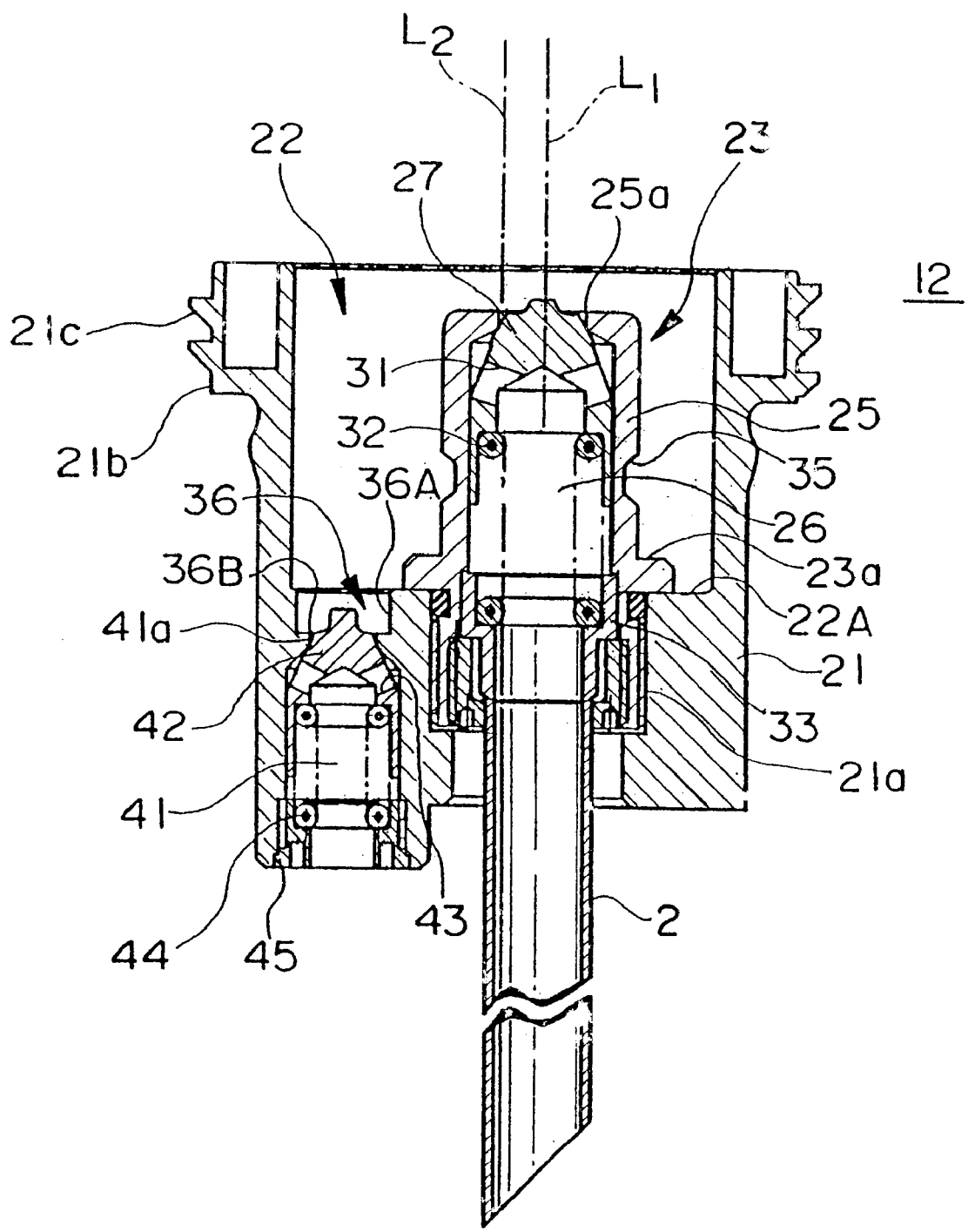
FIG. 2 is a vertical sectional view of a plug which is incorporated in said preferred embodiment of the connector according to the present invention.
Figure 3:
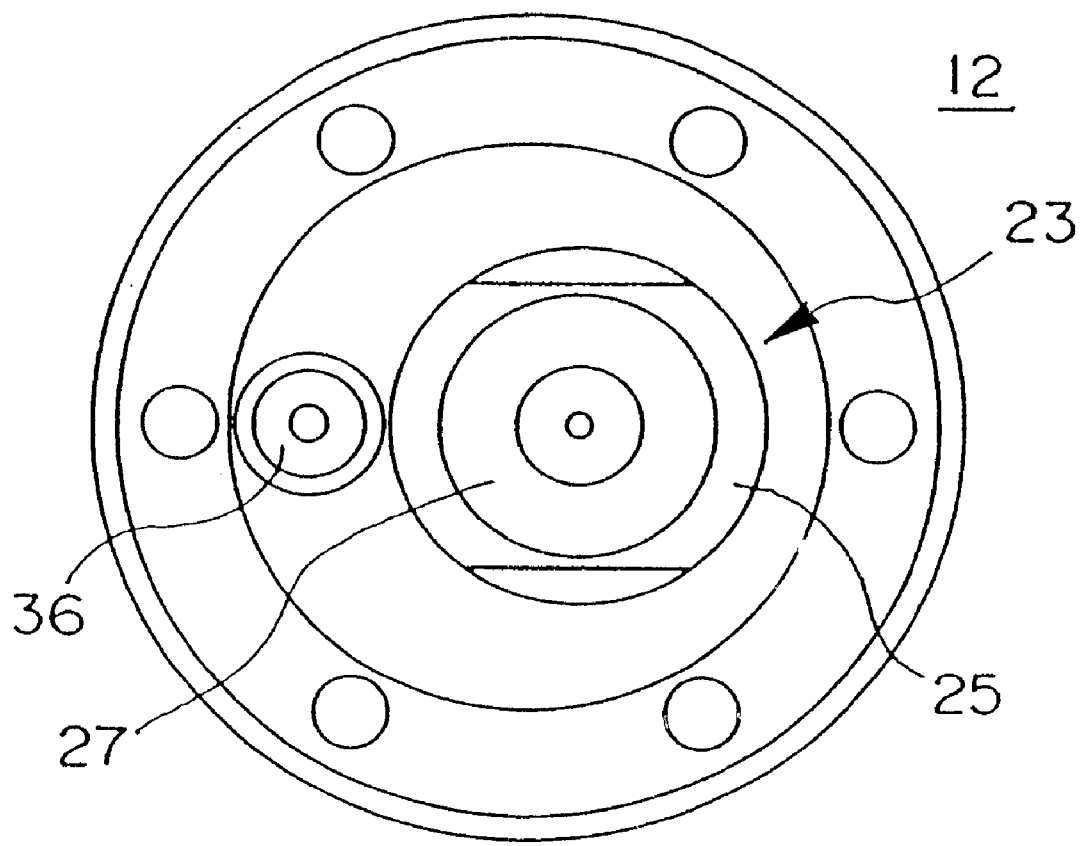
FIG. 3 is a plan view of said plug which is incorporated in said preferred embodiment of the connector according to the present invention.

Next, the structure of the plug 12 will be explained with reference to FIGS. 2 and 3. In these figures, the symbol 21 denotes a main body of the plug, and its upper portion is formed as a concave portion 22.

In the concave portion 22, a plug portion 23 which protrudes in the upwards direction from the bottom surface 22A of said concave portion 22 is integrally fixed by being screwed to a threaded portion 21a of the plug main body 21. At this time, the central axis L1 of the plug portion 23 is eccentrically displaced from the central axis L2 of the plug main body 21.

Next, the detailed structure of this plug portion 23 will be explained.

The reference symbol 25 denotes a main tube body in the interior of which there is formed a liquid conduit (main conduit) 26, and at its end there is formed an aperture portion 25a, into and out of which there goes a valve 73, to be described hereinafter, which is provided on the side of the socket 13.

A valve 27 is provided inside the main tube body 25 so as to be slidable therein, and at the end portion (at the upper side of the figure) of this valve 27 there are formed communication holes 31 which communicate its interior and its exterior together.

A spring 32 is fitted in at the rear end portion of the valve 27, and the valve 27 is always biased by this spring 32 towards the end of the main tube body 25 (its upper end in the figure).

Due to this, the end portion of the valve 27 closes the aperture portion 25a formed in the end portion of the main tube body 25, and thereby blocks the liquid conduit 26.

Moreover, the reference symbol 33 denotes a stop which is fitted into the lower end portion of the main tube body 25 and which is engaged against and stops the spring 32.

Around the outer circumferential surface of the main tube body 25 there is formed an engagement stop groove 35, which is shaped as a ring concaved in the outwardly radial direction. When an engagement tube 58 on the side of the socket 13 is engaged into this plug portion 23, this engagement stop groove 35 engages with a latching ball 66 which will be described hereinafter.

A syphon tube 2 is screwed into the inner surface of the lower end portion of the main tube body 25 and integrally connected therewith, and is disposed in the fluid which is stored in the container.

A flange 21b is formed upon the upper end portion of the plug main body 21, and upon this flange 21b there is formed a threaded portion 21c which is screwed into a threaded portion which is formed in an aperture portion of the container.

In the bottom surface 22a of the concave portion formed in the upper surface of the plug main body 21 there is formed a concave engagement portion 36 which is shaped as a cylindrical tube yet further concaved into said bottom surface 22a, and an enlarged tip portion 62a of a position determination pipe (position determination member) 62 which is fixed to the socket 13 is inserted into this concave portion 36.

A gas conduit 41 which leads to the lower surface of the plug main body 21 is pierced through the bottom surface 36B of the concave engagement portion 36 in a position which is eccentric from the central axis of the plug main body 21, just like the plug portion 23.

A valve 42 is provided within this gas conduit 41 so as to be slidable therein, and at the end portion of this valve 42 there are formed communication holes 43 which communicate its interior and its exterior together.

A spring 44 is fitted in at the rear end portion of the valve 42, and the valve 42 is always biased in the direction of its end by this spring 44. Due to this, the end portion of the valve 42 closes the aperture portion 41a, and thereby blocks the gas conduit 41.

Namely, at the upper stage of the aperture portion 41a of the gas conduit 41 whose opening and closing is controlled by the valve 42, the concave engagement portion 36 is formed to be of a diameter greater than the inner diameter of said aperture portion 41a.

The reference symbol 45 denotes a stopper for engaging with and stopping the spring which is fitted in the lower end portion of the gas conduit 41.

Structure of the Socket

Next, the structure of the socket 13 will be explained with reference to FIGS. 4 and 5.

In these figures, the reference symbol 51 denotes a sleeve. At the upper end portion of this sleeve 51 there is formed an finger engagement flange 51a which projects in the radially outward direction.

Furthermore, at the lower end portion of the sleeve 51, there is formed a step portion 51b which projects in the radially inward direction and engages with a flange portion 58a which is integrally formed upon the lower end portion of an engagement tube 58 to be described hereinafter, thus preventing said sleeve 51 from coming off.

Yet further, the diameter of the wall portion of the sleeve 51 is increased over a larger diameter portion 53 thereof, so as to allow passage of a gas conduit 52.

The reference symbol 55 denotes a main tube body, inside which a liquid conduit (main conduit) 56 is formed.

At the upper end portion of this main tube body 55 there is integrally fixed a flange 57 for finger engagement which projects in the radially outward direction, and in this flange 57 there is formed a gas transport hose passage hole 57a through which the gas transport hose 7 is passed.

Further, a threaded portion 55a is formed in the lower end portion of the main tube body 55, and an engagement tube 58 which is engaged to the plug portion 12 is screwed into this threaded portion 55a.

This engagement tube 58 and main tube body 55 are held within the sleeve 51 in the state of always being biased towards the rear end thereof by a spring 61 which is disposed in an empty space defined by the outer circumferential surface of the engagement tube 58, the lower end portion of the main tube body 55, and the inner circumferential surface of the sleeve 51.

Figure 4:
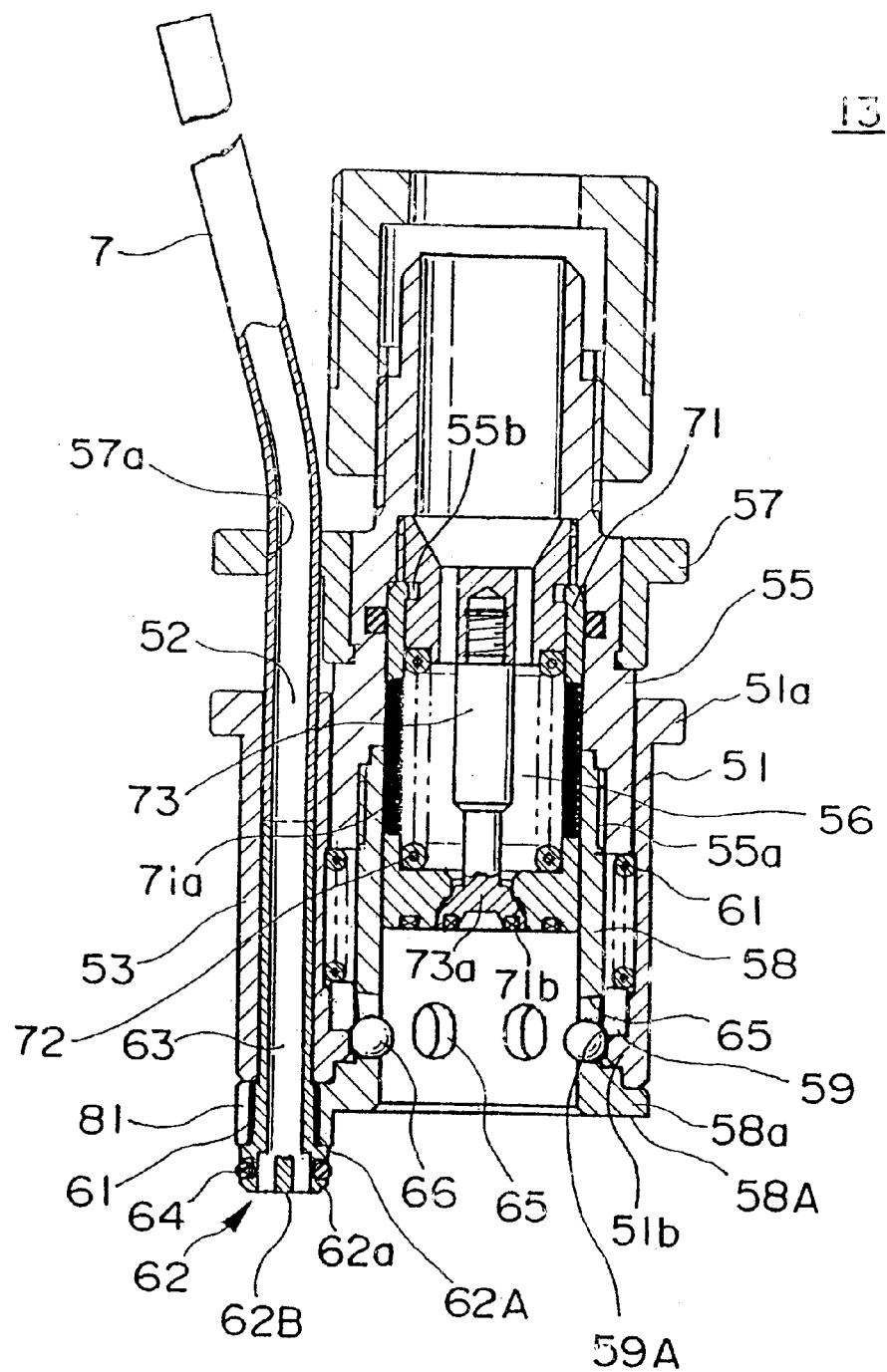
FIG. 4 is a vertical sectional view of a socket which is incorporated in said preferred embodiment of the connector according to the present invention.
Figure 5:
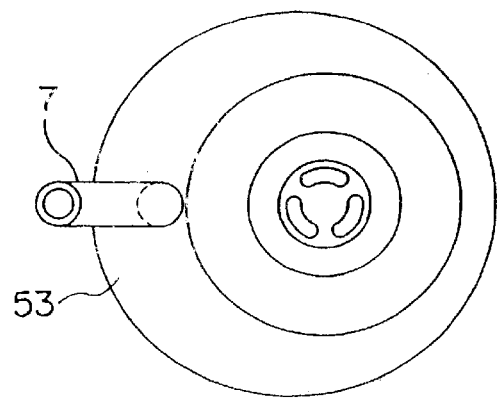
FIG. 5 is a plan view of said socket which is incorporated in said preferred embodiment of the connector according to the present invention.
Figure 6:
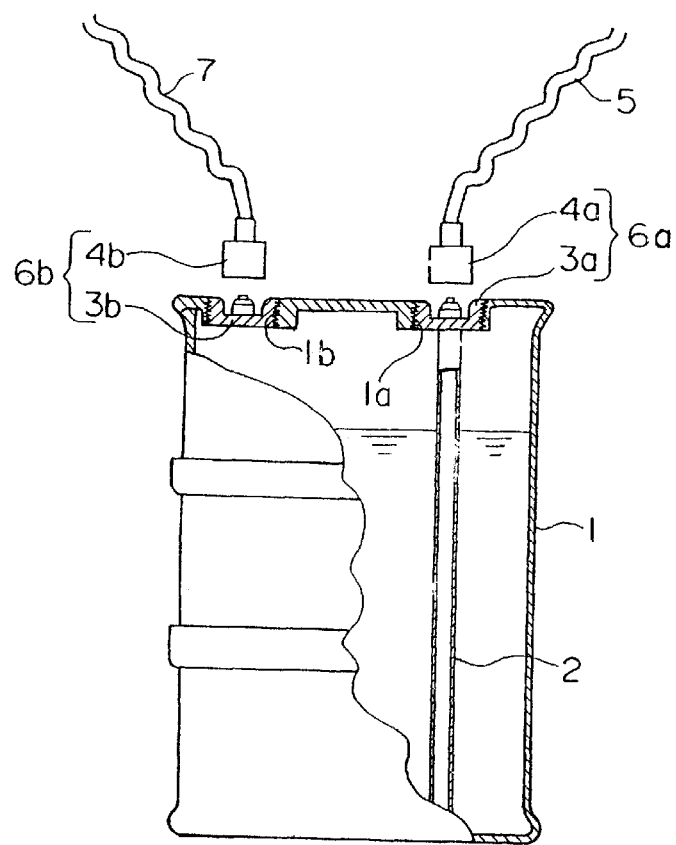
FIG. 6 is a view showing a prior art example of a connector which used when taking a liquid out from a container.
Figure 7A:
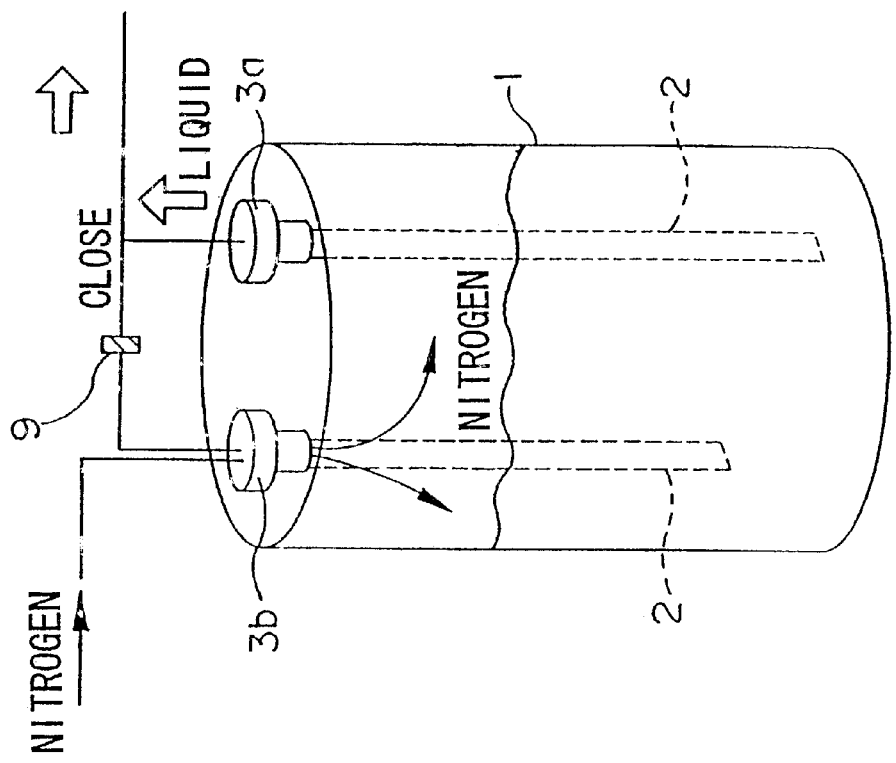
FIG. 7 is a schematic view showing the circulation of a liquid, with the view (a) showing in schematic form a situation in which liquid circulation is being performed using a connector having only one conduit, while the view (b) shows in schematic form a situation in which liquid is being taken out using a connector having a plurality of conduits.
Figure 7B:
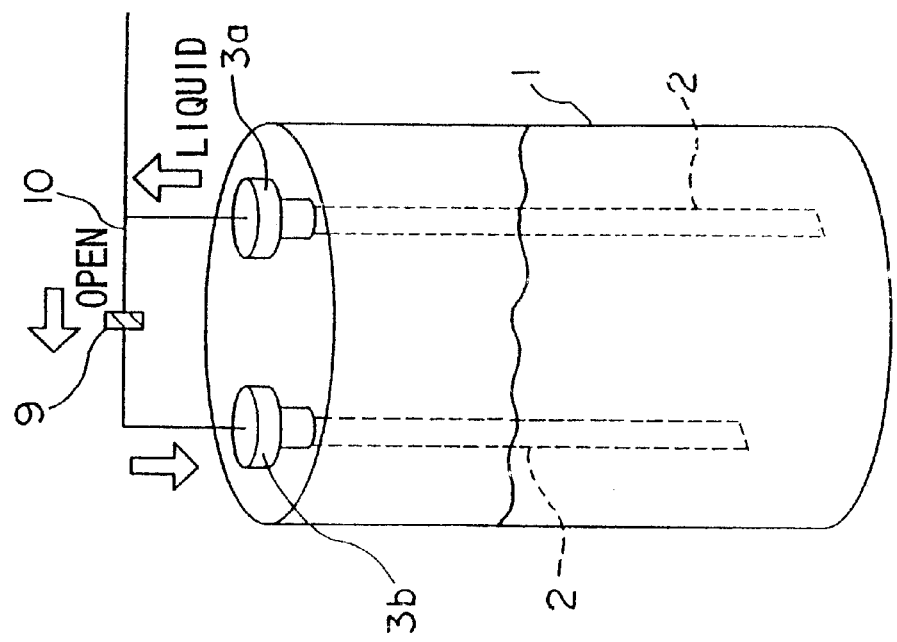

The reference symbol 59 denotes a ring which has a tapered surface 59A at its radially inward side end portion (its lower surface in FIG. 4)

The flange portion 58a which is provided at the end portion of the engagement tube 58 also is provided with a portion 81 of larger diameter, just like the sleeve 51, and a threaded portion 61 is formed upon this larger diameter portion 81.

This threaded portion 61 and the gas conduit 52 which is formed to pass through the larger diameter portion 53 of the sleeve 51 are kept mutually coaxial by a position determination pipe 62 which is passed through the larger diameter portions 53 and 81 and is screwed into the threaded portion 61.

An enlarged tip portion 62a of the interior of this position determination pipe 62 is formed so as to branch into a plurality of branch gas conduits 63, and a seal member 64 is fitted around the outer circumference of this enlarged tip portion 62a.

A plurality of tapered holes 65 are provided around the periphery of the lower portion of the engagement tube 58.

The tapered holes 65 gradually enlarge in the direction from the inner peripheral surface of the engagement tube 58 towards its outer peripheral surface, and latching balls 66 are fitted in these tapered holes 65 so as to be movable.

At this time the latching balls 66 jut out somewhat in the radially inward direction from the inner circumferential surface of the engagement tube 58, and the connection state of the plug 12 and the socket 13 is maintained by their jutting out portions engaging into the engagement stop groove 35 which is formed in the plug portion 23.

The reference symbol 71 denotes a slide tube. This slide tube 71 may be made, for example, of a fluoroplastic, and a bellows 71a is formed at an intermediate portion thereof in its axial direction, integrally with its other portions.

The rear end portion of the slide tube 71 is formed as bent inward in the radial direction, and this bent portion is fixed into a groove 55b formed in the bottom portion of the main tube body 55 which, in cross section in a vertical plane, is shaped like a letter "L", thus being prevented from dropping out.

The reference symbol 72 denotes a spring.

This spring 72 always biases the slide tube 71 in the direction of its tip, and acts so as to position it in its position furthest in the downwards direction as seen in FIG. 4.

In this position, aperture portions 71b which are formed at the end portion of the slide tube 71 are closed by a valve 73 which is formed integrally with the main tube body 55.

However, when the end portion of the slide tube 71 is pressed upwards from below by the tip of the plug portion 23, the bellows 71a is compressed in the axial direction, and the end portion of the slide tube 71 is held up relative to the valve 73, so that due to this the aperture portions 71b are opened.

Next, the connection operation of connecting the socket 13 to the plug 12 will be explained using FIG. 1.

In preparation for this connection operation, a lid which is screwed onto the aperture portion of the container is removed- and the plug 12 to which the syphon tube 2 has been connected is screwed on to this aperture portion. Furthermore, a liquid transport hose (not shown in the figures) which leads to the liquid conduit 56 and an gas transport hose 7 which leads to the gas conduits 52 and 63 are connected in advance to the socket 13.

First when, with the socket 13 positioned above the plug 12 approximately coaxially with the plug portion 23, the socket 13 is gradually inserted into the plug 12, the outer periphery of the main tube body 25 pushes the latching balls 66 in radially outwards directions.

At this time a gap is opened up between the ring 59 and the step portion 51b, since the latching balls 66 push the ring 59 in the upwards direction against the resistance of the biasing force of the spring 61.

When this occurs, the latching balls 66 enter into this gap, and it becomes possible for the socket 13 to be inserted further into the plug 12.

As this further insertion progresses, the latching balls 66 engage into the engagement stop groove 35, and the spring 61 pushes the ring 59 downwards.

Due to this, the ring 59 comes back into contact with the step portion 51b, which completes the insertion process.

In this state the socket 13 does not come away from the plug 12 even if it is pulled upwards, since the plug 12 and the socket 13 are locked together by the latching balls 66 being engaged into the engagement stop groove 35.

Accordingly, the connection state between this plug 12 and socket 13 comes to be securely maintained.

On the other hand, when the socket 13 is to be pulled away from the plug 12, the operator pulls the sleeve 51 upwards.

When he does so, a gap opens up between the step portion 51b and the flange portion 58a, and the latching balls 66 become able to shift into this gap.

Due to this, the latching balls 66 are removed from the engagement stop groove 35, and the locked together state of the plug 12 and the socket 13 is released, so that it becomes possible to pull the socket 13 away from the plug 12.

Since, in the state in which the socket 13 is completely inserted into the plug 12, the end portion 73a of the valve 73 on the side of the socket 13 and the end portion of the valve 27 on the side of the plug portion 23 are contacted together, and the valve 27 is shifted to the rear end side against the biasing force of the spring 32 which is overcome, thereby the aperture portion 25a of the main tube body 25 is opened.

At the same time, the end portion of the slide tube 71 on the side of the socket 13 and the end portion of the main tube body 25 on the side of the plug 12 are contacted together.

Since at this time the end portion of the slide tube 71 is shifted, by compression of the bellows 71a, towards the side of the rear end portion against the biasing force of the spring 72 which is overcome, thereby the aperture portion 71b of the slide tube 71 is opened.

By doing this, the liquid conduit 56 on the side of the socket 13 and the liquid conduit 26 on the side of the plug 12 are mutually connected together, and it becomes possible to take out liquid from the container.

Since as described above the projection position of the plug portion 23 is eccentric from the central axis L2 of the plug main body 21, thereby, when the engagement tube 58 on the side of the socket 13 is engaged to the plug portion 23 on the side of the plug 12, mutual axial alignment of the enlarged tip portion 62a on the side of the socket 13 and the concave engagement portion 36 on the side of the plug 12 is performed at the same time, and it becomes unnecessary to perform individual positional alignment of the gas sub-conduits 52, 63, and 41.

Accordingly coaxial alignment of the central axis L1 of the plug portion 23 to the central axis L2 of the plug main body 21 is obtained automatically, and the user is freed from the troublesome operation of manually ensuring mutual alignment of these elements.

Since, according to this construction, the tip surface 62B of the enlarged tip portion 62a and the end portion of the valve 42 which is provided to the gas conduit 41 on the side of the plug main body 21 are contacted together when the enlarged tip portion 62a is engaged into the concave engagement portion 36, and the valve 42 is shifted in the direction of its rear end against the biasing force of the spring 44 which is overcome, thereby the aperture portion 41a is opened.

By doing this, the gas conduits 52 and 63 on the side of the socket 13 and the gas conduit 41 on the side of the plug 12 are mutually connected together, and it becomes possible for gas such as nitrogen or the like to be taken into the container.

When the gas conduits 52 and 63 on the side of the socket 13 and the gas conduit 41 on the side of the plug 12 are mutually connected together, a gas-tight seal between these conduits is ensured by the seal member 64 which is integrally fixed around the outer periphery of the enlarged tip portion 62a.

In other words, the seal between the gas conduits 41, 52, and 63 is performed by the seal member 64 which is interposed between the outer circumferential surface 62A of the enlarged tip portion 62a and the inner peripheral wall 36A of the concave engagement portion 36.

Now, when (as in the prior art) the sealing construction is implemented by the interposition of the seal member 64 between the end surface 62B of the enlarged tip portion 62a and the bottom surface 36B of the concave engagement portion 36, then, since the position of the end surface 62B of the enlarged tip portion 62a is regulated by the position in which the end surface 58A of the engagement tube 58 and the flange 23a of the plug portion 23 are in mutual contact (which is not desirable), accordingly there is a danger that, if these elements are not processed to high dimensional accuracy during manufacture, the seal member 64 should undesirably become separated from the bottom surface 36B due to the influence of dimensional error, so that the sealing performance becomes deteriorated.

By contrast, if as in this preferred embodiment of the present invention the sealing construction is implemented by the sealing member 64 being interposed between the outer circumferential surface 62A of the enlarged tip portion 62a and the inner circumferential wall 36A of the concave engagement portion 36, then, since deviation only occurs in the vertical positioning even if moderate errors occur during manufacture in the dimensions of the various elements while the seal member 64 continues to seal properly between the outer circumferential surface 62A and the inner peripheral wall 36A, accordingly a seal of high reliability is provided which is not easily influenced by dimensional errors.

When the liquid conduits 26 and 56 are mutually connected together and the gas conduits 41, 52, and 63 are also mutually connected together by the operation explained above of connecting together the plug 12 and the socket 13, then, by driving a pump not shown in the figures, it is possible to take out fluid stored in the container via the liquid transport hose which has been connected to the socket 13 to the outside.

At this time buildup of vacuum in the container is avoided by taking in nitrogen into the container via the gas transport hose 7 which has been connected to the socket 13.

What is claimed is:

1. A connector comprising a plug which closes an aperture portion formed in a container and a socket which is connected to a hose, and which, by connection together of said plug and said socket, mutually communicates together main conduits which are formed in said plug and said socket, and sub-conduits which are formed in said plug and said socket; wherein said plug comprises a plug portion to which said socket is engaged and which maintains the connection state to said socket, with said main conduit being provided in said plug portion while said sub-conduit is provided external to said plug portion, wherein a concave portion is formed on the end surface side of said plug, and said plug portion projects in the upward direction from a bottom portion of said concave portion, with its projection position being eccentric from a central axis of said plug.

2. A connector according to claim 1, wherein said socket comprises an engagement tube to which said plug portion is engaged, hole portions which are formed in a wall portion of said engagement tube spaced at intervals around its peripheral direction, latching balls which are disposed in said hole portions so as freely to enter into and come out of said engagement tube, and a sleeve which is fitted over said engagement tube and slides freely in the axial direction with respect thereto, and which when thus slid projects said latching balls from said hole portions to within said engagement tube.

3. A connector according to claim 2, wherein a wall portion of said sleeve and an en portion of said engagement tube are partially radially enlarged, and said sub-conduit on the side of said socket is formed so as to pass through said large diameter portions; and further comprising position determination members which are fixed to said sleeve and to said engagement tube so as to mutually position them so that the portions of said sub-conduit which are formed in said large diameter portions are mutually connected together.

4. A connector according to claim 3, wherein said position determination members are made with their internal portions in pipe form having through holes, and can be inserted into the sub-conduits which are formed to pierce through the large diameter portions of said sleeve and said engagement tube.

5. A connector according to claim 4, wherein said plug comprises, at a higher stage than an aperture portion of said sub-conduit, a concave engagement portion whose diameter is greater than the internal diameter of said aperture portion and which can engage with said pipe shaped position determination member.

6. A connector according to claim 5, wherein a seal member is provided between said concave engagement portion and said position determination member and seals between them.

7. A connector according to claim 6, wherein said seal member is provided upon the outer circumferential surface of said position determination member.

8. A connector according to claim 4, wherein a gas transport hose for transport of gas is connected to said position determination member.

9. A connector comprising a plug which closes an aperture portion formed in a container and a socket which is connected to a hose, and which, by connection together of said plug and said socket, mutually communicates together main conduits which are formed in said plug and said socket, and sub-conduits which are formed in said plug and said socket; wherein said plug comprises a plug portion to which said socket is engaged and which maintains the connection state to said socket, with said main conduit being provided in said plug portion while said sub-conduit is provided external to said plug portion, wherein said plug portion is attached by being screwed to a threaded hole formed in said plug.

10. A connector according to claim 9, wherein a flange is formed upon said plug portion which regulates the amount of screwing into said threaded hole by contacting a bottom portion of said plug.

11. A connector according to claim 1, wherein said plug is fitted to an aperture portion which is formed in a container which holds liquid.

12. A connector comprising a plug which closes an aperture portion formed in a container and a socket which is connected to a hose, and which, by connection together of said plug and said socket, mutually communicates together main conduits which are formed in said plug and said socket, and sub-conduits which are formed in said plug and said socket; wherein said plug comprises a plug portion to which said socket is engaged and which maintains the connection state to said socket, with said main conduit being provided in said plug portion while said sub-conduit is provided external to said plug portion, wherein a valve is provided in said plug portion which, when said plug portion and said socket are connected together, slides so as to open said main conduit.

13. A connector according to claim 1, wherein a slide tube is provided in said socket which, when said plug portion and said socket are connected together, slides so as to open said main conduit.

14. A connector according to claim 13, wherein at an intermediate portion of said slide tube a bellows is provided which is formed integrally with other portions thereof.

15. A connector comprising a plug which closes an aperture portion formed in a container and a socket which is connected to a hose, and which, by connection together of said plug and said socket, mutually communicates together main conduits which are formed in said plug and said socket, and sub-conduits which are formed in said plug and said socket; wherein said plug comprises a plug portion to which said socket is engaged and which maintains the connection state to said socket, with said main conduit being provided in said plug portion while said sub-conduit is provided external to said plug portion, wherein a valve which opens when said plug portion and said socket are connected together is provided in said sub-conduit in said socket.

16. A connector according to claim 1, wherein a syphon tube is connected to said plug so as to be communicated to said main conduit.

17. A connector according to claim 1, wherein a transport hose is connected to said socket so as to be communicated to said main conduit.

18. A connector according to claim 1, wherein said plug and said socket are made from a fluoroplastic material.

* * * * *